United States Patent

Nepela et al.

[11] Patent Number: 5,685,645
[45] Date of Patent: Nov. 11, 1997

[54] ROLL BALANCE SUB-AMBIENT PRESSURE AIR BEARING SLIDER

[75] Inventors: Daniel A. Nepela, San Jose; Ciuter Chang, Fremont, both of Calif.

[73] Assignee: Read-Rite Corporation, Milpitas, Calif.

[21] Appl. No.: 689,511

[22] Filed: Aug. 13, 1996

[51] Int. Cl.[6] ............................................. F16C 32/06
[52] U.S. Cl. ............................................. 384/12; 384/123
[58] Field of Search ............................ 384/12, 123, 122, 384/121, 112; 360/103

[56] References Cited

U.S. PATENT DOCUMENTS

| | | | |
|---|---|---|---|
| 5,327,310 | 7/1994 | Bischoff et al. | 360/103 |
| 5,359,480 | 10/1994 | Nepela et al. | 360/103 |
| 5,473,485 | 12/1995 | Leung et al. | 360/103 |
| 5,568,981 | 10/1996 | Nepela et al. | 384/12 |

*Primary Examiner*—Lenard A. Footland
*Attorney, Agent, or Firm*—Nathan N. Kallman

[57] ABSTRACT

A sub-ambient pressure air bearing slider is configured with longitudinal air-bearing rails that have angular side recesses near the trailing end of the slider. Sub-ambient pressure regions formed within the side recesses during disk operation oppose the asymmetrical lift forces which cause undesirable roll. The slider provides improved roll and flying height characteristics.

9 Claims, 3 Drawing Sheets ns, and moving
ROLL BALANCE SUB-AMBIENT PRESSURE AIR BEARING SLIDER

CROSS-REFERENCE TO COPENDING PATENT APPLICATION

U.S. patent application Ser. No. 08/419,760, filed Apr. 10, 1995, now U.S. Pat. No. 5,568,981, and assigned to the same assignee, discloses a sub-ambient pressure air bearing slider having good flying characteristics with a simple, symmetrical and easily manufactured design. The subject matter of the aforementioned patent application is incorporated herein by reference.

FIELD OF THE INVENTION

This invention relates to air bearing sliders of magnetic head assemblies used in disk drives, and in particular to sub-ambient pressure air bearing sliders having sub-ambient pressure areas.

BACKGROUND OF THE INVENTION

Magnetic head assemblies that fly relative to rotating magnetic disks are used extensively in disk drives for recording or reading data. An objective for optimizing the non-contact transducing relationship between the flying head and the magnetic recording disk is to maintain a very close, constant, and stable spacing between the head slider and the disk surface. A close spacing, coupled with very narrow transducing gaps and very thin magnetic record films, allows recording of very short wavelength, high frequency signals, thereby maximizing the density and storage capacity of data recording. Constant spacing between the flying head slider and the disk surface minimizes the fluctuations in signal amplitude, therefore optimizing signal resolution. This constant spacing must be maintained as the head slider moves from one data track to another data track of the disk. In moving between data tracks and moving between the inner and outer regions of the disk surface, the magnetic head continuously experiences velocity and skew angle variations, and therefore the effects of the change in velocity and skew angle on the flying height must be kept to a minimum.

Air bearing sliders used in disk drives typically have a leading end, and trailing end at which one or more thin film transducers are deposited. Generally, the sliders have longitudinal rails that extend, from a tapered portion at the leading end, all or part way to the trailing end. The tapered portions provide pressurization for air bearing regions during disk rotation. A slider, Which is seated in contact with the disk surface when at rest, is provided with a fast takeoff as disk rotation commences, to a flying attitude relative to the disk. The suspension mechanism of the slider provides an effective spring load force and moments which are balanced by the air bearing or pressure at designed flying attitudes during disk drive operation.

The slider is oriented with the longitudinal rails substantially orthogonal to the disk radius, so that the two rails comprise an inner and an outer rail. Differences in lift force between the inner and outer rails cause a roll effect whereby the slider air-bearing surface is tilted with respect to the disk, in the radial direction. The differences in lift force can be caused by the differential in air velocity between the inner and outer rails during disk rotation, or it can be caused by the asymmetrical effects of skew or asymmetrical pressure distribution generated by the air bearing slider. A high roll can degrade the transducing characteristics of the magnetic head and cause disk drive reliability problems.

Some sub-ambient pressure sliders comprise, in addition to the aforementioned longitudinal rails, a transverse cross-rail, with a tapered region at the leading edge disposed between the longitudinal rails, and relief vents between the cross-rail and the longitudinal rails. The relief vents extend from the slider leading end to a central recess that extends from the cross-rail to the trailing end of the slider. The central recess defines an effective sub-ambient pressure region which provides an effective additional load force opposing the lifting force of the air bearing regions. The amount of sub-ambient pressure and resultant load force are determined by the size, depth, and location of the recess for a given operational condition.

This slider design, while providing several desirable air bearing characteristics such as good air bearing stiffness, excellent track seeking performance, and wide applicability of a single design, evidences sub-optimal roll characteristics, with a high roll at high skew angle, high velocity operating conditions.

An air bearing slider design which would provide the advantages of the aforementioned sub-ambient pressure air bearing slider, and would additionally have a reduced roll effect at high velocity and skew angle, would be desirable.

SUMMARY OF THE INVENTION

An object of this invention is to provide an improved sub-ambient pressure air bearing slider.

Another object of this invention is to provide a sub-ambient pressure air bearing slider with optimal roll at high velocity operating condition.

Another object of this invention is to provide a sub-ambient pressure air bearing slider with optimal roll at high skew angle operating condition.

In a preferred embodiment of this invention, a sub-ambient pressure air bearing slider is made with longitudinal rails having recesses along the sides of the rails extending from the trailing edge of the slider. These recesses define additional sub-ambient pressure regions which provide balance for roll effects.

DETAILED DESCRIPTION OF THE INVENTION

Figure 1A:
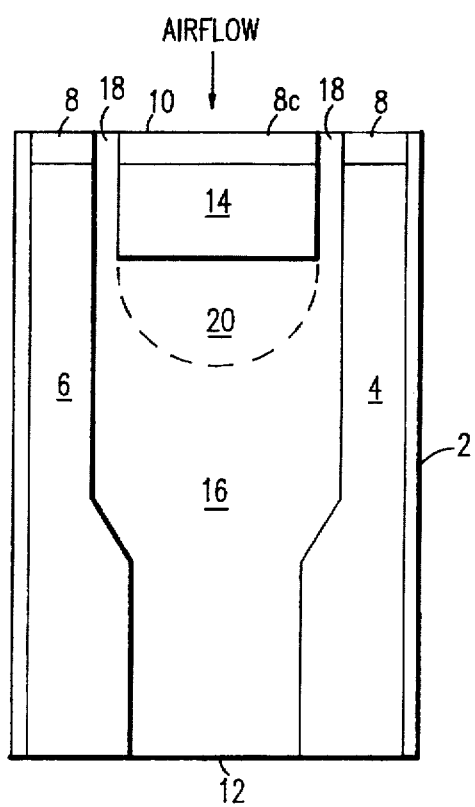
FIG. 1A is a plan view of a prior art slider, showing sub-ambient pressure region for no skew.
Figure 1B:
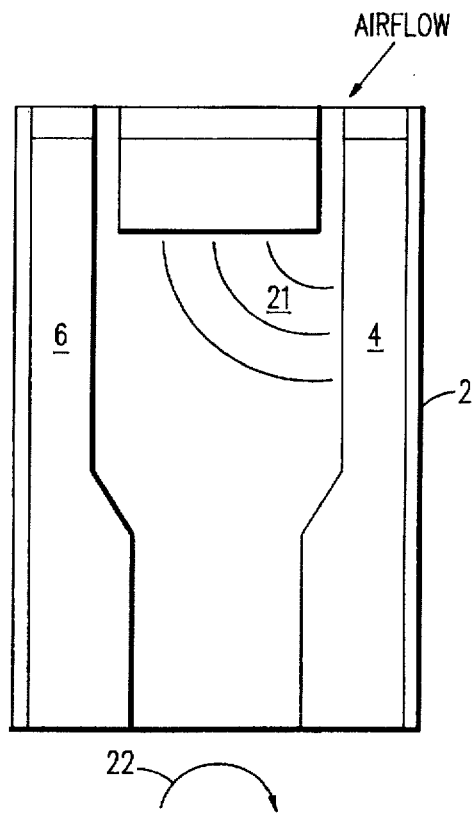
FIG. 1B is a plan view of a prior art slider, showing sub-ambient pressure region for a positive skew angle.

With reference to FIG. 1A, a specific embodiment of a prior art sub-ambient pressure slider as described in the referenced patent application is shown. Slider 2 is configured with raised side rails 4 and 6 extending from tapered regions 8 to trailing end 12. When the slider is associated with the Upper surface of the disk, the magnetic transducer is deposited on rail 4, which is oriented as the outer rail relative to the center of the disk. The opposite situation occurs for the lower surface of the disk. For simplicity, the slider will be described according to the upper surface convention. A cross-rail 14 is disposed centrally between side rails 4 and 6, adjacent to tapered region 8. A sub-ambient pressure recess 16 is formed by etching between crossrail 14 and side rails 4 and 6, and extends to trailing end 12. Relief vents 18 are formed between side rails 4, 6, and crossrail 14, and extend from leading edge 10 to sub-ambient pressure recess 16. Positive air pressure under side rails 4 and 6 and cross-rail 14 provides lifting force. Region 20 is the sub-ambient pressure region for a no skew condition. Sub-ambient pressure in region 20 of recess 16 provides a downward force opposing the lifting force. FIG. 1B shows sub-ambient region 21 for positive angle skewed condition, which is asymmetric with respect to rails 4 and 6. A rotational moment 22 results, which combines with the asymmetrical lift force caused by differential air velocities under inner rail 6 and outer rail 4, to yield a roll effect. High skew conditions typically occur at the outer edge of the disk where velocity is greatest, therefore the roll effect is most pronounced at high skew angle, high velocity operating conditions.

Figure 2:
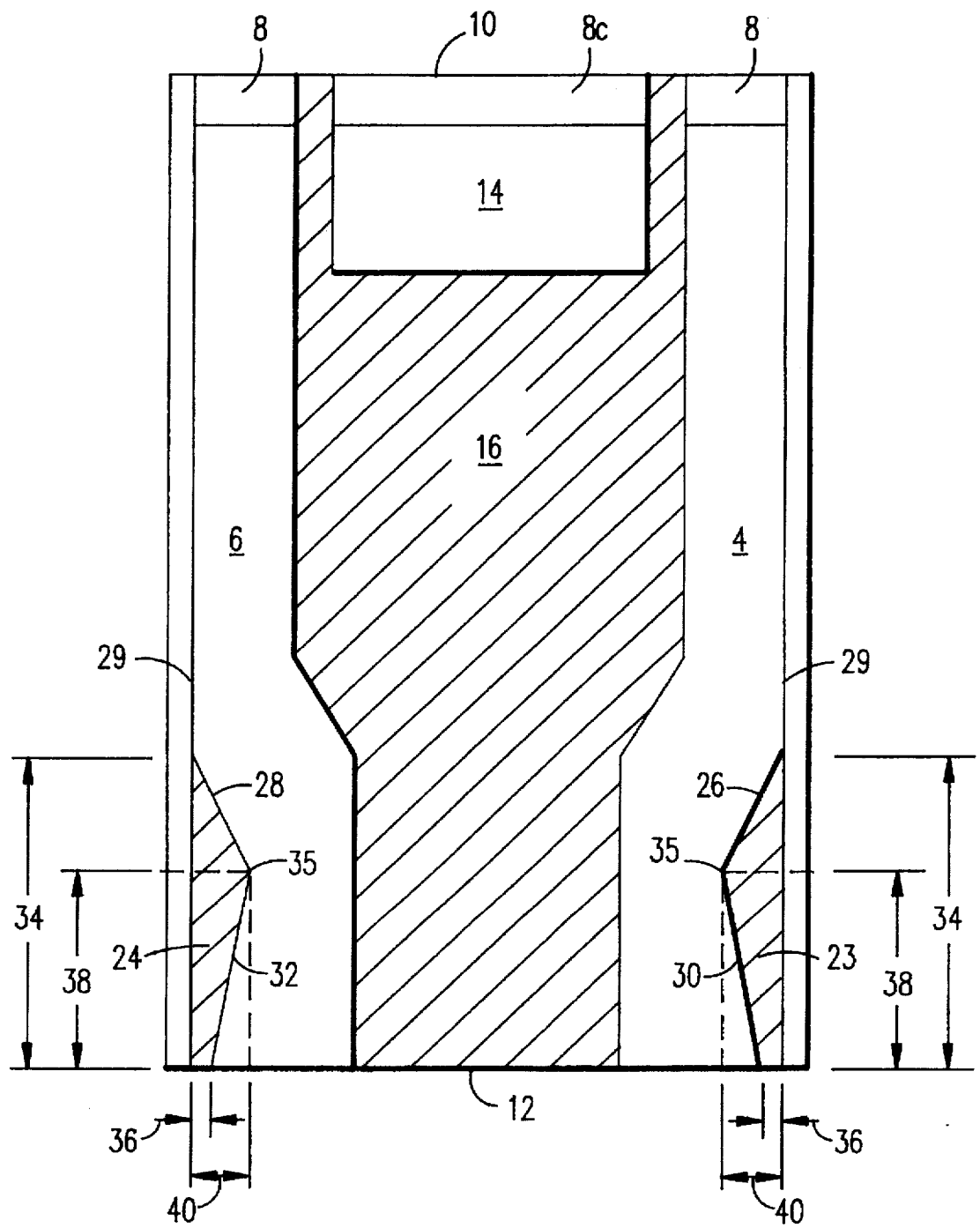
FIG. 2 is a plan view of an air bearing slider, made in accordance with this invention.

With reference to FIG. 2, the sub-ambient pressure slider of this invention is shown. Etched regions 23 and 24 are formed adjacent to trailing portions of longitudinal rails 4 and 6. Regions 23 and 24 are triangular, rectangular, trapezoidal or arcuate in form, and are defined by edges 26, 28, 30, and 32. In a specific embodiment of this invention, edges 26 and 28 extend from outer edges 29 of longitudinal rails 4 and 6, at a distance 34 which is about 30% of the slider length from trailing end 12, to corners 35 at a distance 38 which is about 20% of the slider length from trailing end 12, and at a distance 40 which is about 5% of the slider width from outer edges 29. Edges 30 and 32 extend from corners 35 to trailing end 12 at a distance 36 which is about 5% of the slider width from outer edges 29.

Figure 3:
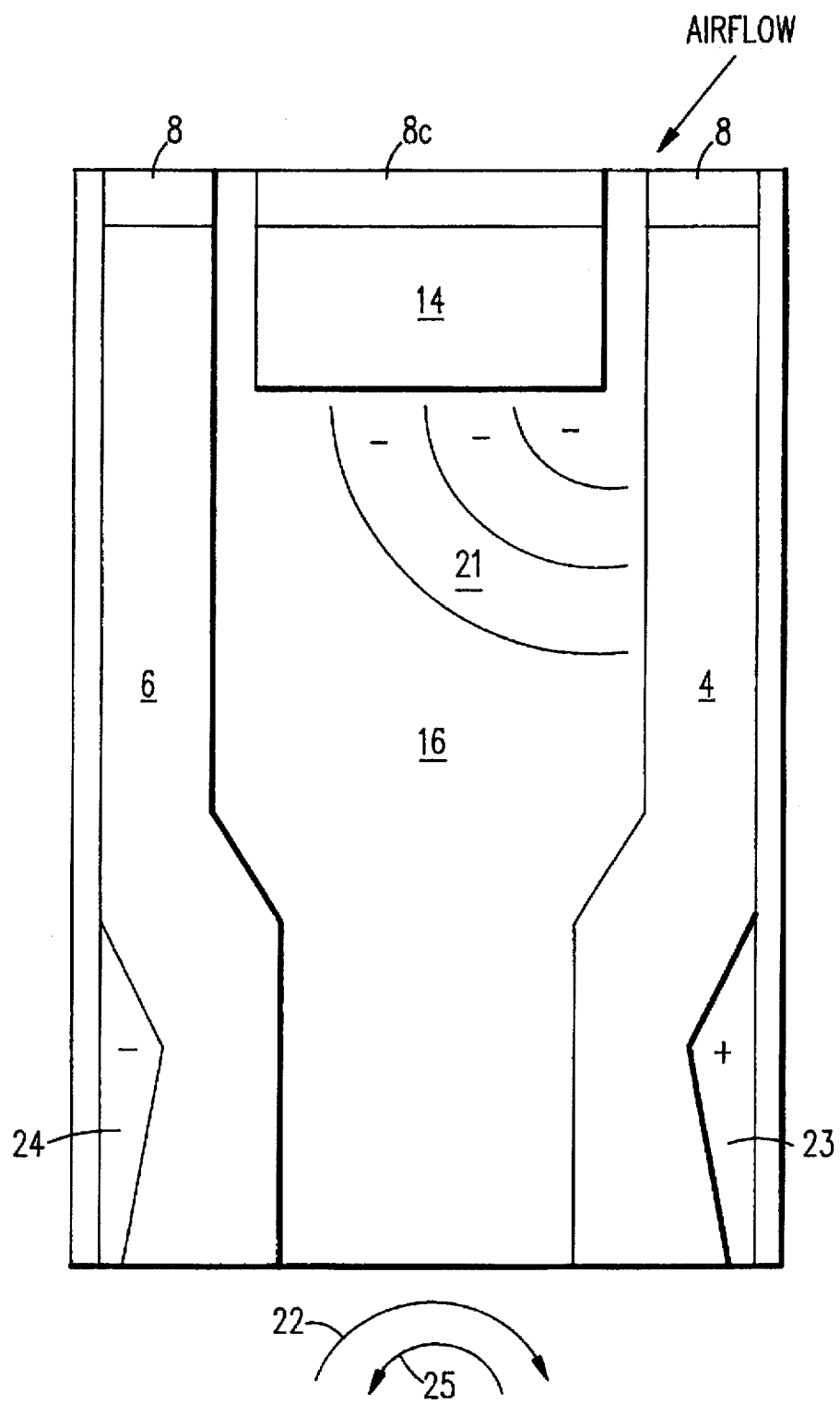
FIG. 3 is a plan view of the slider of this invention, illustrating regions of sub-ambient pressure and lift force.

FIG. 3 shows the slider of FIG. 2 under positive angle skewed operating conditions. During disk rotation, sub-ambient pressure conditions exist in regions 21 and 24, providing downward suction force, whereas lifting force is provided in region 23. The rotational moment 25 from the asymmetrical forces in regions 23 and 24 opposes the rotational moment 22 of the central recess 16. This opposing moment will provide balance and thereby reduce the roll effect.

Table 1 shows modeled roll values for the prior art slider and the slider of this invention, as a function of radius and skew angle at typical disk drive operating conditions. It is seen that, for the critical high-velocity, high skew conditions at the outer radius of the disk, roll values are significantly reduced for the slider of this invention.

TABLE I

Roll values for varying radius/skew conditions for prior art slider and slider of this invention operating at a disk velocity of about 7200 rpm (revolutions per minute).

| Radius slider (inches) | Skew angle (degrees) | Roll-prior art slider (micro-radians) | Roll-inventive (micro-radians) |
|---|---|---|---|
| 0.8 | −10 | −8.53 | −4.22 |
| 1.8 | +15 | +24.38 | +4.59 |

It should be understood that the particular dimensions, distances, and other parameters set forth above may be varied for different applications of air bearing sliders used in disk drive operation. Although this invention is shown as implemented with a specific embodiment of the prior art sub-ambient pressure slider, it may be implemented with other embodiments thereof. The invention is applicable to air bearing sliders having three pads, i.e., a tripad slider with a pad at the trailing end, as well as two-rail negative pressure sliders. The roll-balance etched regions near the trailing end may be asymmetrical, or a single etched region on one rail only may be employed. The roll balance etched steps typically are 0.1 to 5% of the total slider area and have a depth in the range of 10 to 100% of the main central recess. The optimal size and depth of the roll balance etched steps will be determined by the moment generated by the main recess and the moment generated by the roll balance etched steps.

What is claimed is:

1. An air bearing slider for a thin film magnetic head having an air bearing surface with a leading end and a trailing end and defining opposing first and second sides between said ends comprising:

first and second tapered regions disposed at said leading end;

first and second longitudinal rails extending from said first and second tapered regions respectively, each of said rails having portions at said trailing end with inner and outer edges;

side recesses formed respectively adjacent to said outer edges of said portions of said rails, said side recesses extending to said trailing end.

2. An air bearing slider as in claim 1, wherein said side recesses extend symmetrically from said first and second sides of said slider.

3. An air bearing slider as in claim 1, wherein said side recesses are triangular, rectangular, trapezoidal or arcuate in shape.

4. An air bearing slider as in claim 1, wherein said inner edges of said portions of said rails at said trailing end are parallel to said first and second sides of said slider.

5. An air bearing slider as in claim 1, wherein said outer edges of said portions of said rails at said trailing end are formed with angled sections.

6. An air bearing slider as in claim 1, including a third tapered region disposed at said leading end between said first and second tapered regions.

7. An air bearing slider as in claim 6, including a cross-rail formed adjacent to said third tapered region and located between said first and second longitudinal rails.

8. An air bearing slider as in claim 7, including a central sub-ambient pressure recess extending from said cross-rail towards said trailing end.

9. An air bearing slider as in claim 8, including at least one relief vent disposed adjacent to said cross-rail and extending from said leading end to said sub-ambient pressure recess.

* * * * *